US012715148B2

(12) United States Patent
Tao et al.

(10) Patent No.: US 12,715,148 B2
(45) Date of Patent: Aug. 25, 2026

(54) VACUUM ADSORPTION SYSTEM

(71) Applicants: Tyco Electronics (Shanghai) Co., Ltd., Shanghai (CN); TE Connectivity Services GmbH, Schaffhausen (CH)

(72) Inventors: Zongjie (Jason) Tao, Shanghai (CN); Dandan (Emily) Zhang, Shanghai (CN); Roberto Francisco-Yi Lu, Bellevue, WA (US)

(73) Assignees: Tyco Electronics (Shanghai) Co., Ltd., Shanghai (CN); TE Connectivity Services GmbH, Schaffhausen (CH)

( * ) Notice: Subject to any disclaimer, the term of this patent is extended or adjusted under 35 U.S.C. 154(b) by 1057 days.

(21) Appl. No.: 17/880,815

(22) Filed: Aug. 4, 2022

(65) Prior Publication Data

US 2023/0037715 A1 Feb. 9, 2023

(30) Foreign Application Priority Data

Aug. 6, 2021 (CN) ......................... 202110903463.9

(51) Int. Cl.
*B25J 15/06* (2006.01)
*B25J 9/16* (2006.01)

(52) U.S. Cl.
CPC ......... *B25J 15/0625* (2013.01); *B25J 9/1612* (2013.01)

(58) Field of Classification Search
CPC .... B25J 15/0625; B25J 9/1612; B25J 9/1633; G05B 19/44; G05B 2219/39505; G05B 2219/41304; H05K 13/0409
See application file for complete search history.

(56) References Cited

U.S. PATENT DOCUMENTS 11,772,281 B1 * 10/2023 Wieckowski ........ B25J 15/0616 294/183
2019/0126496 A1 * 5/2019 Bronowski ......... G07F 17/0071
2019/0168396 A1 * 6/2019 Leidenfrost ............ B25J 9/1697
2019/0236933 A1 * 8/2019 Capps ................... B66C 1/0262
2020/0189122 A1 * 6/2020 Polido ................... B25B 11/005
2020/0338754 A1 * 10/2020 Schneider ............ B25J 15/0052

* cited by examiner

*Primary Examiner* — Stephen A Vu
(74) *Attorney, Agent, or Firm* — Barley Snyder

(57) ABSTRACT

A vacuum adsorption system includes a cylinder including a cylinder block, a piston, and a piston rod mounted in the cylinder block, and a vacuum pressure control device controlling a vacuum pressure in an inner cavity of the cylinder block. The piston rod has a vacuum suction hole communicating with the inner cavity. The vacuum pressure in the inner cavity is controlled so that a contact force applied by the piston rod on an object adsorbed by the vacuum suction hole of the piston rod is less than or equal to a predetermined contact force.

21 Claims, 3 Drawing Sheets

VACUUM ADSORPTION SYSTEM

CROSS-REFERENCE TO RELATED APPLICATION

This application claims the benefit of the filing date under 35 U.S.C. § 119(a)-(d) of Chinese Patent Application No. 202110903463.9, filed on Aug. 6, 2021.

FIELD OF THE INVENTION

The invention relates to a vacuum adsorption system.

BACKGROUND

In the prior art, a vacuum nozzle is commonly used to pick up an electronic devices, such as a chip. Because the electronic devices are easily damaged, if the contact force (not the vacuum adsorption force) exerted on the electronic devices by the vacuum suction nozzle when adsorbing the electronic devices is too large, the electronic devices will be damaged. However, the contact force is not controllable with the existing vacuum suction nozzle.

SUMMARY

A vacuum adsorption system includes a cylinder including a cylinder block, a piston, and a piston rod mounted in the cylinder block, and a vacuum pressure control device controlling a vacuum pressure in an inner cavity of the cylinder block. The piston rod has a vacuum suction hole communicating with the inner cavity. The vacuum pressure in the inner cavity is controlled so that a contact force applied by the piston rod on an object adsorbed by the vacuum suction hole of the piston rod is less than or equal to a predetermined contact force.

BRIEF DESCRIPTION OF THE DRAWINGS

The invention will now be described by way of example with reference to the accompanying Figures, of which.

DETAILED DESCRIPTION OF THE EMBODIMENTS

Figure 1:
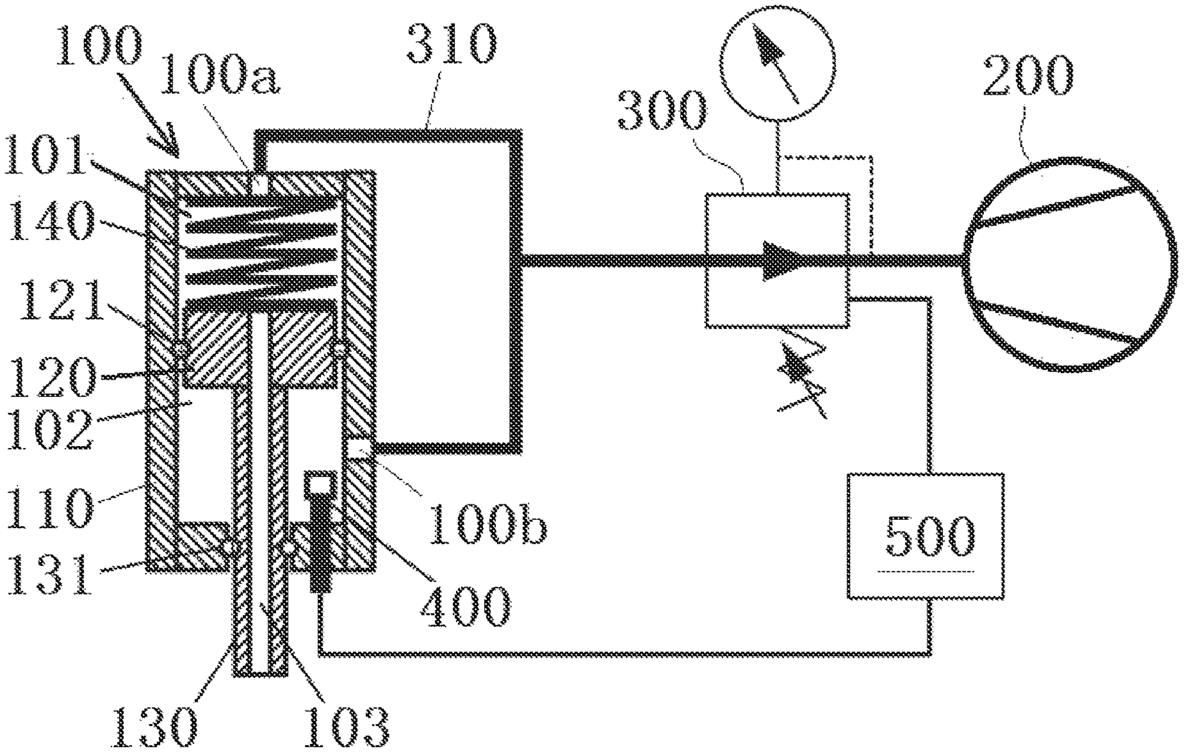
FIG. 1 is a schematic diagram of a vacuum adsorption system according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
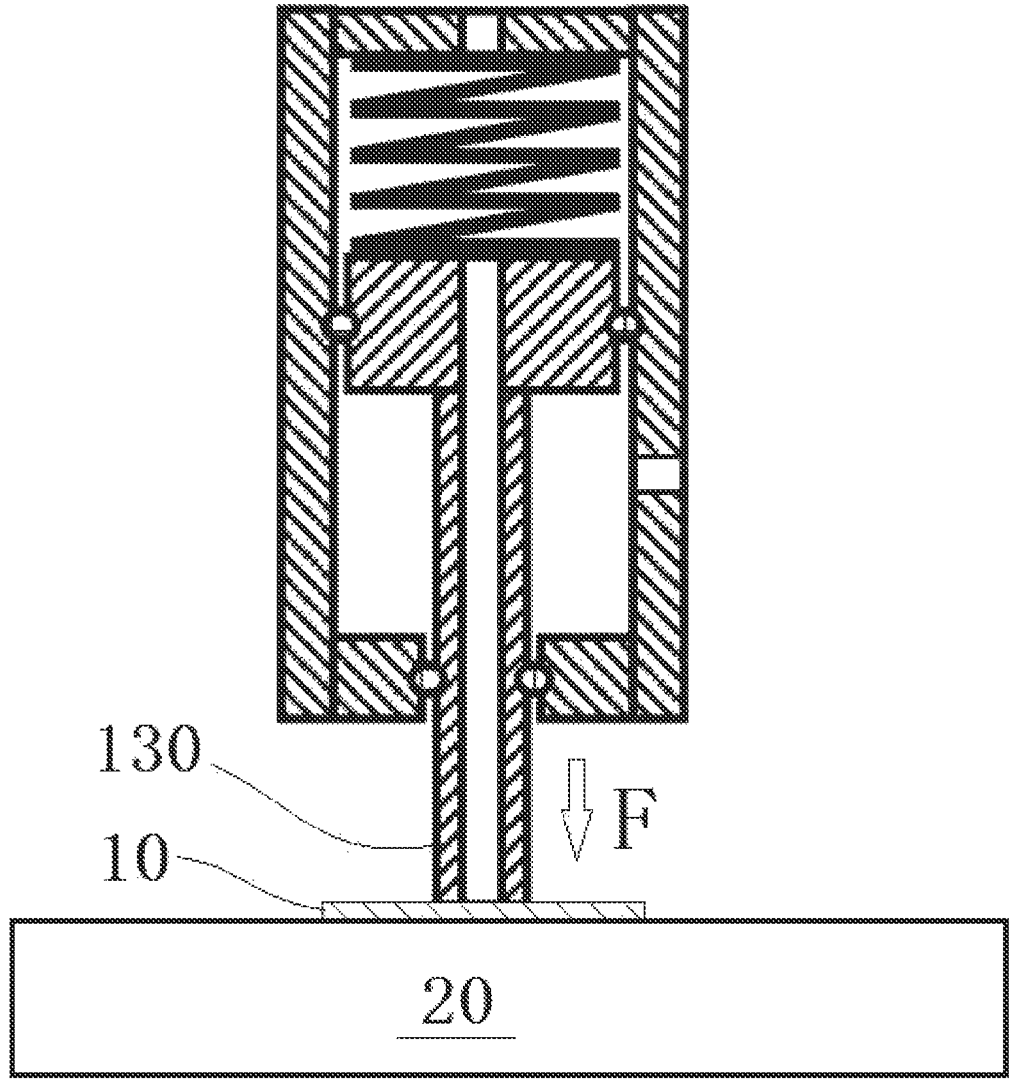
FIG. 2 is a schematic diagram of a cylinder of the vacuum adsorption system shown in FIG. 1 when adsorbing objects.

FIG. 1 shows a schematic diagram of a vacuum adsorption system according to an exemplary embodiment of the present invention; FIG. 2 shows a schematic diagram of the vacuum adsorption system shown in FIG. 1 when cylinder 100 adsorbs object 10.

As shown in FIG. 1 and FIG. 2, in the illustrated embodiment, the vacuum adsorption system includes a cylinder 100 and a vacuum pressure control device. The cylinder 100 includes a cylinder block 110 and a piston 120 and a piston rod 130 mounted in the cylinder block 110. The piston rod 130 is connected to the piston 120, and the piston 120 and the piston rod 130 can move axially with respect to the cylinder block 110. The vacuum pressure control device is used to control the vacuum pressure P in the inner cavity 101 and 102 of the cylinder block 110.

As shown in FIG. 1 and FIG. 2, in the illustrated embodiment, a vacuum suction hole 103 for adsorbing the object 10 is formed on the piston rod 130. The vacuum suction hole 103 communicates with the inner cavity 101 and 102 of the cylinder block 110 so that the vacuum pressure P in the vacuum suction hole 103 and the vacuum pressure P in the inner cavity 101 and 102 of the cylinder block 110 are equal.

As shown in FIG. 1 and FIG. 2, in the illustrated embodiment, the vacuum pressure control device controls the vacuum pressure P in the inner cavity 101 and 102 so that the contact force F exerted by the piston rod 130 on the object 10 when adsorbing the object 10 is not greater than the predetermined contact force, or even equal to zero. In this way, the object 10 can be prevented from being damaged by an excessive contact force F.

Note that in the illustrated embodiment, the contact force F refers to a pushing force exerted by the piston rod 130 to push the object 10 onto the support table 20, not the vacuum adsorption force exerted by the vacuum suction hole 103 of the piston rod 130 on the object 10. Once the adsorbed object 10 leaves the support table 20, the contact force F will disappear.

In some applications, the object 10 must not be subjected to excessive contact force F. For example, when the object 10 is an electronic device, especially a high-precision chip, it is desirable that the contact force F be as small as possible, for example equal to zero. In the illustrated embodiment, the piston rod 130 having a vacuum suction hole 103 constitutes a vacuum suction nozzle for adsorbing electronic devices.

As shown in FIG. 1 and FIG. 2, in the illustrated embodiment, the vacuum adsorption system also includes a vacuum generating device 200. The vacuum generating device 200 may be a vacuum pump or a vacuum generator. The negative pressure port of the vacuum generating device 200 is connected to the cylinder block 110 through a connecting pipeline 310 to communicate with the inner cavity 101 and 102 of the cylinder block 110.

As shown in FIGS. 1 and 2, in the illustrated embodiment, the vacuum pressure control device includes a valve 300. The valve 300 is installed on the vacuum generating device 200 to control the vacuum pressure P generated by the vacuum generating device 200.

As shown in FIG. 1 and FIG. 2, in the illustrated embodiment, the piston 120 separates the inner cavity 101 and 102 of the cylinder block 110 into a first vacuum chamber 101 and a second vacuum chamber 102. The piston rod 130 is located in the second vacuum chamber 102 of the cylinder block 110. The piston rod 130 has an inner end connected to the piston 120 and an outer end extending from the cylinder block 110.

As shown in FIGS. 1 and 2, in the illustrated embodiment, the cylinder 100 also includes a spring 140 provided in the first vacuum chamber 101. Two ends of spring 140 are connected to cylinder block 110 and piston 120, respectively.

As shown in FIG. 1 and FIG. 2, in the illustrated embodiment, a first port 100*a* communicating with the first vacuum chamber 101 and a second port 100*b* communicating with the second vacuum chamber 102 are formed in the cylinder block 110. The negative pressure port of the vacuum generating device 200 is connected to the first port 100*a* and the second port 100*b* of the cylinder block 110 through the connecting pipeline 310. This makes the vacuum pressure P in the first vacuum chamber 101, the vacuum pressure P in the second vacuum chamber 102, and the vacuum pressure P in the vacuum suction hole 103 equal.

As shown in FIG. 1 and FIG. 2, in the illustrated embodiment, the contact force F exerted by the piston rod 130 on the object 10 is actually the resultant force exerted on the piston 120 and the piston rod 130, which can be calculated according to the following formula:

$$F=G+P*S_2-P*S_1-K*\Delta L,\text{ in which}$$

G is the weight of piston 120 and piston rod 130;

$S_1$ is the first force bearing area of the piston 120 in the first vacuum chamber 101;

$P*S_1$ is the vacuum suction force exerted by the first vacuum chamber 101 on the piston 120;

$S_2$ is the second force bearing area of the piston 120 in the second vacuum chamber 102;

$P*S_2$ is the vacuum suction force exerted by the second vacuum chamber 102 on the piston 120;

K is the stiffness of spring 140;

ΔL is the tension amount of spring 140.

As shown in FIG. 1 and FIG. 2, in the illustrated embodiment, the first force bearing area S1 of the piston 120 is larger than the second force bearing area S2 of the piston 120.

As shown in FIG. 1 and FIG. 2, in the illustrated embodiment, if the contact force F exerted by the piston rod 130 on the object 10 is greater than zero, the tension amount ΔL of the spring 140 is greater than zero. If the contact force F exerted by the piston rod 130 on the object 10 is equal to zero, the tension amount ΔL of the spring 140 equals zero. Therefore, the contact force F exerted by the piston rod 130 on the object 10 can be controlled by controlling the tension amount ΔL of the spring 140.

As shown in FIG. 1 and FIG. 2, in the illustrated embodiment, the vacuum pressure control device also includes a controller 500. The controller 500 is adapted to control an opening amount of the valve 300 according to the tension amount ΔL of the spring 140, so as to control the vacuum pressure P.

As shown in FIG. 1 and FIG. 2, in the illustrated embodiment, when the tension amount ΔL of the spring 140 is not greater than a predetermined tension amount, the contact force F exerted by the piston rod 130 on the object 10 when adsorbing the object 10 is not greater than a predetermined contact force. The vacuum pressure control device is adapted to control the vacuum pressure P in the inner cavity 101 and 102 so that the tension amount ΔL of the spring 140 is not greater than the predetermined tension amount.

As shown in FIGS. 1 and 2, in the illustrated embodiment, the vacuum pressure control device also includes a height sensor 400. The height sensor 400 is mounted on the cylinder block 110 to detect a current height h of the piston 120. The controller 500 is adapted to calculate the tension amount ΔL of the spring 140 according to the following formula, $$\Delta L=H0-H,\text{ in which}$$

H0 is the height of the piston 120 when the spring 140 is at its initial length L0. Note that these two values H0 and L0 are known and can be obtained in advance.

Note that the present invention is not limited to the illustrated embodiment. For example, in another exemplary embodiment of the present invention, the vacuum pressure control device may include a length sensor mounted on the cylinder block 110 and adapted to detect a current length L of the spring 140. At this time, the controller 500 can calculate the tension amount ΔL of the spring 140 according to the following formula, $$\Delta L=L-L0,\text{ in which}$$

L0 is the initial length of spring 140.

As shown in FIG. 1 and FIG. 2, in an exemplary embodiment of the present invention, the vacuum pressure control device is suitable for controlling the vacuum pressure P in the inner cavity 101 and 102 of the cylinder block 110 to be equal to the predetermined vacuum pressure, so that the contact force F exerted by the piston rod 130 on the object 10 when adsorbing the object 10 is equal to zero.

As shown in FIG. 1 and FIG. 2, in the illustrated embodiment, if the contact force F applied to the object 10 by the piston rod 130 when adsorbing the object 10 is equal to zero, the tension amount ΔL of the spring 140 equals zero. Therefore, as previously described, if the tension amount ΔL of the spring 140 is controlled by the vacuum pressure control device to be equal to zero, the contact force F exerted by the piston rod 130 on the object 10 when it adsorbs the object 10 can be controlled to be equal to zero.

As shown in FIG. 1 and FIG. 2, in the illustrated embodiment, the height sensor 400 and the controller 500 constitute a closed-loop feedback control system, so that the vacuum pressure P in the inner cavity 101 and 102 of the cylinder 100 can be controlled to be equal to the predetermined vacuum pressure, so that the contact force F exerted by the piston rod 130 on the object 10 when adsorbing the object 10 is equal to zero.

As shown in FIG. 1 and FIG. 2, in the illustrated embodiment, the vacuum suction hole 103 in the piston rod 130 communicates with one of the first vacuum chamber 101 and the second vacuum chamber 102, but is not communicated with the other of the first vacuum chamber 101 and the second vacuum chamber 102.

As shown in FIGS. 1 and 2, in the illustrated embodiment, the vacuum suction hole 103 axially penetrates through the piston rod 130 and the piston 120 to communicate with the first vacuum chamber 101.

Figure 3:
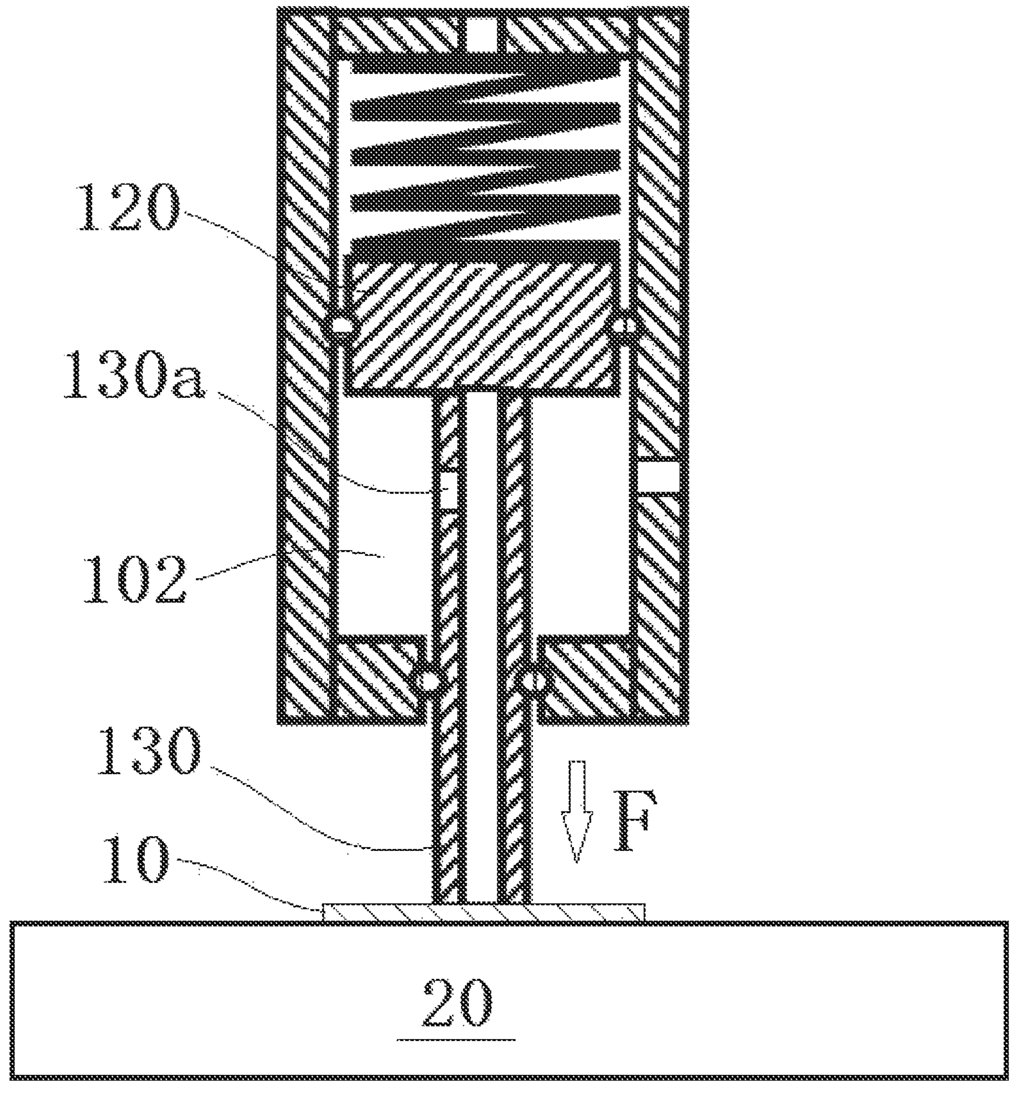
FIG. 3 is a schematic diagram of a cylinder of a vacuum adsorption system according to another exemplary embodiment of the present invention.

However, please note that the present invention is not limited to the illustrated embodiment. For example, FIG. 3 shows a schematic diagram of a cylinder 100 of a vacuum adsorption system according to another exemplary embodiment of the present invention. As shown in FIG. 3, in the illustrated embodiment, the vacuum suction hole 103 axially penetrates through the piston rod 130 and communicates with the second vacuum chamber 102 through a connecting hole 130*a* formed in the piston rod 130.

As shown in FIG. 1 and FIG. 2, in the illustrated embodiment, the cylinder 100 also includes a first sealing ring 121 and a second sealing ring 131. The first sealing ring 121 is arranged between the piston 120 and the cylinder 110 to seal the mating interface between the piston 120 and the cylinder 110. The second sealing ring 131 is arranged between the piston rod 130 and the cylinder block 110 to seal the mating interface between the piston rod 130 and the cylinder block 110.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A vacuum adsorption system, comprising:

a cylinder including a cylinder block, a piston, and a piston rod mounted in the cylinder block;

a vacuum pressure control device controlling a vacuum pressure in an inner cavity of the cylinder block, the piston rod has a vacuum suction hole communicating with the inner cavity, the vacuum pressure in the inner cavity is controlled so that a contact force applied by the piston rod on an object adsorbed by the vacuum suction hole of the piston rod is less than or equal to a predetermined contact force; and a vacuum generating device having a negative pressure port connected to the cylinder block, the vacuum pressure control device has a valve on the vacuum generating device controlling the vacuum pressure generated by the vacuum generating device.

2. The vacuum adsorption system of claim 1, wherein the cylinder has a first sealing ring arranged between the piston and the cylinder block to seal a mating interface between the piston and the cylinder block.

3. The vacuum adsorption system of claim 2, wherein the cylinder has a second sealing ring arranged between the piston rod and the cylinder block to seal a mating interface between the piston rod and the cylinder block.

4. The vacuum adsorption system of claim 1, wherein the object is an electronic device and the piston rod forms a vacuum suction nozzle for adsorbing the electronic device.

5. The vacuum adsorption system of claim 1, wherein the negative pressure port is connected to the cylinder block through a connecting pipeline to communicate with the inner cavity of the cylinder block.

6. The vacuum adsorption system of claim 5, wherein the piston separates the inner cavity of the cylinder block into a first vacuum chamber and a second vacuum chamber, the piston rod is located in the second vacuum chamber and has an inner end connected to the piston and an outer end protruding from the cylinder block.

7. The vacuum adsorption system of claim 6, wherein the vacuum suction hole communicates with one of the first vacuum chamber and the second vacuum chamber, but does not communicate with the other of the first vacuum chamber and the second vacuum chamber.

8. The vacuum adsorption system of claim 7, wherein the vacuum suction hole axially penetrates through the piston rod and the piston to communicate with the first vacuum chamber.

9. The vacuum adsorption system of claim 7, wherein the vacuum suction hole axially penetrates through the piston rod and communicates with the second vacuum chamber through a connecting hole formed in the piston rod.

10. The vacuum adsorption system of claim 6, wherein the cylinder block has a first port communicating with the first vacuum chamber and a second port communicating with the second vacuum chamber.

11. The vacuum adsorption system of claim 10, wherein the negative pressure port is connected to the first port and the second port of the cylinder block through the connecting pipeline, the vacuum pressure in the first vacuum chamber, the vacuum pressure in the second vacuum chamber, and the vacuum pressure in the vacuum suction hole are equal.

12. The vacuum adsorption system of claim 6, wherein the cylinder has a spring arranged in the first vacuum chamber, a pair of ends of the spring are connected to the cylinder and the piston.

13. The vacuum adsorption system of claim 12, wherein the vacuum pressure control device has a controller controlling an opening amount of the valve according to a tension amount of the spring to control the vacuum pressure.

14. The vacuum adsorption system of claim 13, wherein the vacuum pressure control device has a height sensor installed on the cylinder block to detect a current height of the piston, the controller calculates the tension amount of the spring according to the formula:

$$\Delta L = H0 - H, \text{ in which}$$

H0 refers to a height of the piston when the spring is at its initial length.

15. The vacuum adsorption system of claim 13, wherein the vacuum pressure control device has a length sensor installed on the cylinder block to detect a current length of the spring, the controller calculates the tension amount of the spring according to the formula:

$$\Delta L = L - L0, \text{ in which}$$

L0 is an initial length of the spring.

16. The vacuum adsorption system of claim 13, wherein the vacuum pressure control device controls the vacuum pressure to be equal to a predetermined vacuum pressure so that the contact force is equal to zero.

17. The vacuum adsorption system of claim 16, wherein, if the contact force is equal to zero, the tension amount of the spring equals zero.

18. The vacuum adsorption system of claim 13, wherein, when the tension amount of the spring is less than or equal to a predetermined tension amount, the contact force is less than or equal to the predetermined contact force.

19. The vacuum adsorption system of claim 18, wherein the vacuum pressure control device controls the vacuum pressure in the inner cavity so that the tension amount of the spring is not greater than the predetermined tension amount.

20. A vacuum adsorption system, comprising:

a cylinder including a cylinder block, a piston, a piston rod mounted in the cylinder block, and a first sealing ring arranged between the piston and the cylinder block to seal a mating interface between the piston and the cylinder block; and a vacuum pressure control device controlling a vacuum pressure in an inner cavity of the cylinder block, the piston rod has a vacuum suction hole communicating with the inner cavity, the vacuum pressure in the inner cavity is controlled so that a contact force applied by the piston rod on an object adsorbed by the vacuum suction hole of the piston rod is less than or equal to a predetermined contact force.

21. A vacuum adsorption system, comprising:

a cylinder including a cylinder block, a piston, and a piston rod mounted in the cylinder block; and a vacuum pressure control device controlling a vacuum pressure in an inner cavity of the cylinder block, the piston rod has a vacuum suction hole communicating with the inner cavity, the vacuum pressure in the inner cavity is controlled so that a contact force applied by the piston rod on an object adsorbed by the vacuum suction hole of the piston rod is less than or equal to a predetermined contact force, the object is an electronic device and the piston rod forms a vacuum suction nozzle for adsorbing the electronic device.

* * * * *